W. M. WAMPLER & E. MURPHY.
PIPE FITTING.
APPLICATION FILED DEC. 24, 1915.
1,188,863.
Patented June 27, 1916.
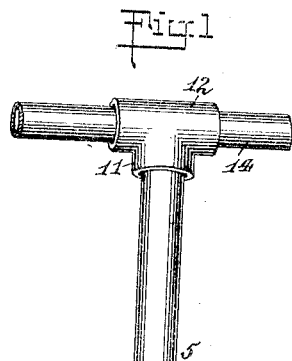
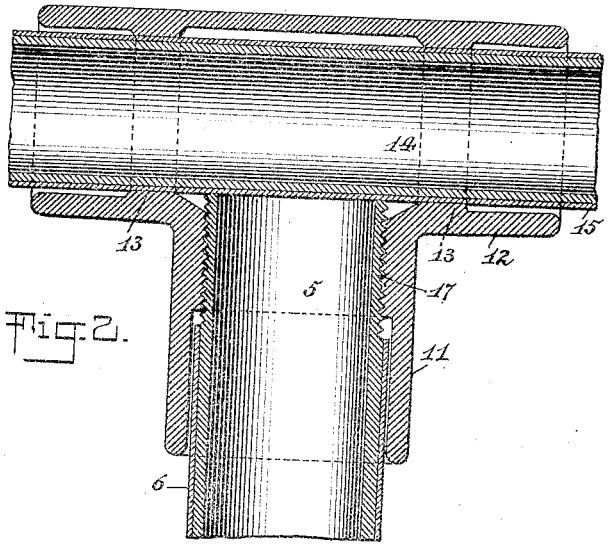
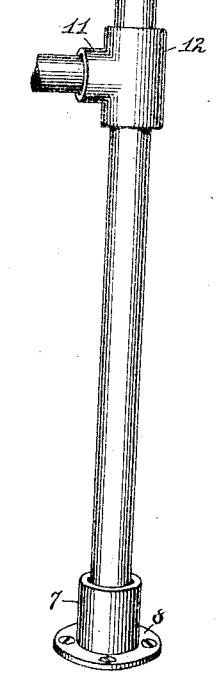
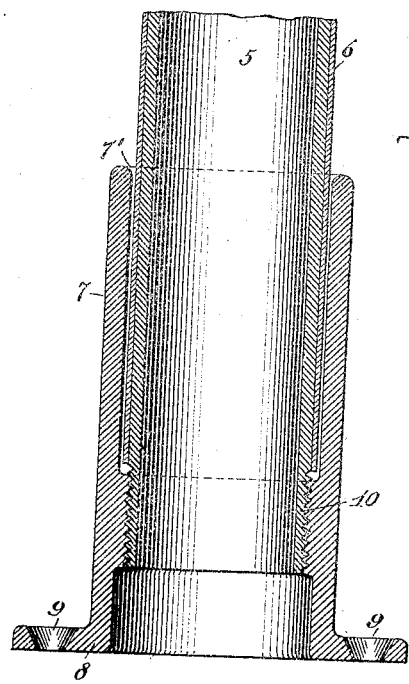

UNITED STATES PATENT OFFICE.

WILLIAM M. WAMPLER AND ERNEST MURPHY, OF NEW YORK, N. Y., ASSIGNORS TO THE ELLCON COMPANY, OF NEW YORK, N. Y., A CORPORATION OF NEW YORK.

PIPE-FITTING.

1,188,863.

Specification of Letters Patent.   Patented June 27, 1916.

Application filed December 24, 1915.   Serial No. 68,530.

*To all whom it may concern:*

Be it known that we, WILLIAM M. WAMPLER, a citizen of the United States, and a resident of New York, borough of Manhattan, county of New York, and State of New York, and ERNEST MURPHY, a subject of His Majesty the King of Great Britain, and a resident of New York, borough of Bronx, county of Bronx, and State of New York, have made and invented certain new and useful Improvements in Pipe-Fittings, of which the following is a specification.

This invention relates to a pipe fitting for use with pipes having an enamel or vitreous coating, the fitting being particularly adapted for use for the support of railings and stanchions, such as are used in subway and elevated trains, public buildings, and analogous places frequented by the public, although it will be readily appreciated that the fittings may be used in numerous ways and for varied purposes.

One of the principal objections against the employment of enamel pipes for use as rests or supports which may be gripped by passengers, has been that, owing to the extreme brittleness of the vitreous or enamel coating, the ends of the pipe which engage the couplings or fittings invariably become chipped, due to contact between the enamel coating and the sides of the fitting. The enamel coating often extends down into the threads, which, when brought into contact with the threads of the couplings, or pipe fittings, during the installation of the railings or stanchions, and due to the slight distortion of the pipe end as it is forcibly secured into the fitting, results in the fracture of the coating, and owing to the vitreous nature thereof often causes long checks and breaks, extending sometimes for an inch or more from the end of the pipes, the edges of the checks being extremely sharp and jagged, similar to the edges of broken glass.

With this in view, an object of the present invention is to provide pipe fittings which are so constructed that these checks and scars in the enamel coating at the ends of the pipes are completely inclosed and hidden from view, thus preserving a neat and sightly appearance and protecting the hands or clothing of passengers against injury.

A further object is to provide a pipe fitting for use upon enamel pipes, which is in the form of a T-coupling, cross or similar shape, so arranged that the right-angle pipe may be forcibly driven against the continuous pipe which extends completely through the head of the fitting. This construction not only allows the right-angle pipe to act as a set screw, whereby the fitting is held in place and the continuity of the one pipe is preserved, but it also is of such nature that the broken or chipped portion of the pipe coatings and the cutting and jagged edges thus formed, are completely covered and inclosed, whereby the entire construction presents a neat and sightly appearance and the danger or likelihood of injury is avoided and a rigid structure is obtained.

Other objects and advantages will appear as the description proceeds, wherein it is to be understood that changes in the precise embodiment of my invention can be made within the scope of what is claimed without departing from the spirit thereof.

The preferred embodiment of my invention is disclosed in the accompanying drawings, wherein:

Figure 1 is a view in perspective of a post or stanchion, as used in subway and elevated trains and other places frequented by the public, with the various fittings secured thereto, embodying the characteristic features of my invention; Fig. 2 is a view in section of a T-coupling and adjoining pipes constructed in accordance with the present invention; and Fig. 3 is a view of a wall or ceiling flange and accompanying pipes, similarly constructed.

Referring specifically to the several views, the pipe 5, which represents the ordinary type of post or stanchion, is provided with an enamel or vitreous coating 6, which, being of the nature of glass, is extremely fragile and brittle.

A floor or ceiling flange is illustrated in detail in Fig. 3, and comprises the cylindrical body 7 and flange 8, the latter being provided with suitable openings 9 for the reception of holding screws or rivets whereby the coupling may be secured to a floor, ceiling or other support. Remote from the free extremity 7' of the cylindrical body, there is provided the restricted threaded portion 10, the diameter of which is somewhat less than the internal diameter of the cylindrical body, and is adapted to engage the threaded extremity of the pipe 5. The cylindrical body 7 therefore acts as a guard and completely incloses the end of the pipe 5, so that such checks and scars as may be caused by the contact of the threads and the slight distortion of the pipe end as it is forcibly screwed into the floor or ceiling flange, are incased and hidden.

The T-coupling disclosed in Fig. 2 comprises a cylindrical body 11, similar to the cylindrical body 7 of the floor or ceiling flange previously described, the cylindrical body in this instance forming the leg of the T-coupling, the head 12 of which may be similarly formed if so desired, but is preferably constructed so as to receive a pipe completely therethrough, so that the continuity thereof may be preserved. The head 12 of the T is provided with the spaced and contracted internal ledges 13, the same being located upon opposite sides of the opening communicating with the cylindrical body 11 and are spaced a distance from the free and opposite extremities of the head, and are of such size as to nicely receive the pipe 14 therein, which is provided with the enamel coating 15.

The leg 11 of the T is provided with a restricted and running thread 17, allowing the pipe 5 to act as a set screw and forcibly engage the continuous pipe 14, to thereby lock the coupling in place upon the pipe 14 and hold the right-angle pipe in position. This manner of securing the coupling and right-angle pipe to the pipe 14, allows for the preservation of the continuity of the latter, so that the post or stanchion 5 is of one piece, a desirable feature. The set screw action of the pipe 5 causes the ledges of the T to forcibly engage the continuous pipe with the result that the fragile coating thereof adjacent these ledges becomes cracked and broken, but, owing to the fact that these ledges are spaced a considerable distance from the ends of the head of the T, the checks and jagged edges so formed are completely inclosed and hidden.

What we claim is:—

1. The combination of a pipe having a vitreous coating and a threaded extremity, and a fitting therefor comprising a hollow cylindrical member with the internal diameter thereof relatively greater than the external diameter of the said vitreous coating, and provided with a threaded portion spaced a distance from the extremity of said cylindrical member and of relatively less diameter than the same, the said pipe, with the vitreous coating, extending within said cylindrical member, spaced from the side walls and engaging the threaded portion thereof.

2. The combination of a pipe having a vitreous coating, and a fitting therefor comprising a hollow cylindrical member with the internal diameter thereof relatively greater than the external diameter of said vitreous coating and provided with a reduced portion spaced a distance from the extremity of said cylindrical member and of relatively less diameter than the same, the said pipe with the vitreous coating extending within said cylindrical member, spaced from the side walls and engaging the reduced portion thereof.

3. The combination of a pipe having a vitreous coating, and a fitting therefor comprising a hollow cylindrical member with the internal diameter thereof relatively greater than the external diameter of said vitreous coating and provided with a reduced portion spaced a distance from the free extremity of said cylindrical member and of relatively less diameter than the same, the said pipe with the vitreous coating extending within said cylindrical member, spaced from the side walls and engaging the reduced portion thereof, a head carried by said hollow cylindrical member, and a second pipe with a vitreous coating thereon extending through said head and held fixed with relation thereto by the first-mentioned pipe.

4. The combination of a pipe having a vitreous coating, and a fitting therefor comprising a hollow cylindrical member with the internal diameter thereof relatively greater than the external diameter of said vitreous coating and provided with a reduced portion spaced a distance from the free extremity of said cylindrical member and of relatively less diameter than the same, the said pipe with the vitreous coating extending within said cylindrical member, spaced from the side walls and engaging the reduced portion thereof, a sleeve-like head carried by said hollow cylindrical member and provided with internally contracted ledges spaced a distance from the free extremities of said sleeve, and a second pipe with a vitreous coating extending through said sleeve-like head, contacting with said internally threaded ledges and receiving the first-mentioned pipe thereagainst, holding said first-mentioned pipe, second-mentioned pipe and fitting, in fixed position.

Signed at New York, county and State of New York, this 23 day of December, 1915.

WILLIAM M. WAMPLER.
ERNEST MURPHY.

Witnesses:
ANNA V. WALSH,
MABEL E. CRITCHLEY.